United States Patent
Yin et al.

(10) Patent No.: US 12,459,843 B2
(45) Date of Patent: Nov. 4, 2025

(54) METHODS AND COMPOSITIONS FOR TREATING INDUSTRIAL WASTEWATER

(71) Applicant: KEMIRA OYJ, Helsinki (FI)

(72) Inventors: Xihui Yin, Marietta, GA (US); Jean Robert Durand, Atlanta, GA (US); Forrest Strickland, Atlanta, GA (US); Anna Casasus, Atlanta, GA (US)

(73) Assignee: KEMIRA OYJ, Helsinki (FI)

( * ) Notice: Subject to any disclaimer, the term of this patent is extended or adjusted under 35 U.S.C. 154(b) by 873 days.

(21) Appl. No.: 17/417,219

(22) PCT Filed: Dec. 30, 2019

(86) PCT No.: PCT/US2019/068959
§ 371 (c)(1),
(2) Date: Jun. 22, 2021

(87) PCT Pub. No.: WO2020/140118
PCT Pub. Date: Jul. 2, 2020

(65) Prior Publication Data
US 2022/0055933 A1    Feb. 24, 2022

Related U.S. Application Data

(60) Provisional application No. 62/785,840, filed on Dec. 28, 2018.

(30) Foreign Application Priority Data

Mar. 25, 2019 (FI) ...................... 20195216

(51) Int. Cl.
| | | |
|---|---|---|
| C02F 9/00 | (2023.01) |
| B01F 33/45 | (2022.01) |
| C02F 1/52 | (2023.01) |
| C02F 1/56 | (2023.01) |
| C02F 1/66 | (2023.01) |
| C02F 1/70 | (2023.01) |
| B01F 101/00 | (2022.01) |
| C02F 101/10 | (2006.01) |

(52) U.S. Cl.
CPC ................ *C02F 9/00* (2013.01); *B01F 33/45* (2022.01); *B01F 2101/305* (2022.01); *C02F 1/5245* (2013.01); *C02F 1/56* (2013.01); *C02F 1/66* (2013.01); *C02F 1/70* (2013.01); *C02F 2101/106* (2013.01)

(58) Field of Classification Search
CPC .. C02F 9/00; C02F 1/5245; C02F 1/56; C02F 1/66; C02F 1/70; C02F 2101/106; B01F 33/45; B01F 2101/305
See application file for complete search history.

(56) References Cited

U.S. PATENT DOCUMENTS

| | | | |
|---|---|---|---|
| 6,033,572 A | 3/2000 | Yano et al. | |
| 9,499,420 B2* | 11/2016 | Ross .................. | C02F 1/70 |
| 2011/0204000 A1 | 8/2011 | Reed et al. | |
| 2016/0251241 A1* | 9/2016 | Chiyomaru .......... | C02F 1/5281 |
| | | | 210/667 |
| 2017/0081227 A1 | 3/2017 | Riffe et al. | |
| 2019/0270657 A1* | 9/2019 | Theodore ............. | C02F 1/5245 |

FOREIGN PATENT DOCUMENTS

| | | |
|---|---|---|
| CA | 2978153 | 3/2019 |
| CN | 102358653 | 2/2012 |
| JP | H11197677 | 7/1999 |

OTHER PUBLICATIONS

"Coagulation and Flocculation in Water and Wastewater Treatment", IWA, 2006, p. 1 para 5 [retrieved from the internet on Feb. 26, 2020 (Feb. 26, 2020) at <https://www.iwapublishing.com/news/coagulation-and-flocculation-water-and-wastewater-treatment>].

* cited by examiner

*Primary Examiner* — Youngsul Jeong
(74) *Attorney, Agent, or Firm* — Robin L. Teskin; Baker, Donelson, Bearman, Caldwell & Berkowitz PC

(57) ABSTRACT

The present embodiments generally relate to methods and compositions for the removal of selenium from a fluid in need of treatment, such as, for example, industrial wastewaters. The methods and compositions for the removal of selenium generally comprise the use of one or more coagulants, such as at least one iron-containing coagulant, and one or more reducing agents, such as at least one sodium sulfite-based reducing agent.

7 Claims, No Drawings

METHODS AND COMPOSITIONS FOR TREATING INDUSTRIAL WASTEWATER

CROSS-REFERENCE TO RELATED APPLICATIONS

This application is a U.S. National Phase application of Int'l Appl. No. PCT/US2019/068959, filed Dec. 30, 2019, which claims priority to U.S. Provisional Appl. No. 62/785,840, filed Dec. 28, 2018. This application further claims the priority benefit of Finnish Appl. No. 20195216, filed Mar. 25, 2019, which are all incorporated herein by reference in their entireties.

FIELD OF THE ART

The present disclosure generally relates to methods and compositions for the treatment of fluids in order to reduce the amount of and/or remove metals and/or oxyanions, especially selenium and compounds comprising selenium, that may be present in said fluids.

BACKGROUND

Industrial wastewaters commonly include a variety of contaminants that require treatment and/or removal before the wastewater can be discharged. Certain industrial processes, such as mining, generate wastewater with toxic metals or oxyanions, including arsenic, mercury, selenium, molybdenum, cadmium, chromium, lead, and barium.

Selenium (Se) is naturally occurring in various minerals on earth and can be released into water resources naturally or by industrial activities such as surface mining, coal-fired power plants, and agricultural activities. While it is an essential trace nutrient for both animals and human beings, excessive amounts of Se can be toxic. Selenium is a water treatment contaminant of concern in industries such as, for example, mining, oil refining, and power generation. As regulatory limits regarding acceptable selenium levels are becoming more stringent, increasing the amount of selenium removal and the efficiency of selenium removal from industrial wastewater is highly desirable. The development of low cost, reliable methods and compositions to treat wastewater comprising selenium is a priority for industries which generate such industrial wastewater.

BRIEF SUMMARY

The present disclosure generally relates to a method for removing selenium from a fluid in need of treatment, wherein said method comprises adding one or more coagulants, e.g., at least one iron containing coagulant, and one or more reducing agents e.g., at least one sodium sulfite-based reducing agent, in an amount effective to reduce the amount of and/or remove at least a portion of the selenium from said fluid in need of treatment. In some embodiments, said one or more coagulants may comprise or may consist of iron containing coagulants. In some embodiments, said one or more coagulants may comprise or consist of ferrous chloride. In some embodiments, the one or more reducing agents may comprise or may consist of sodium sulfite-based reducing agents. In some embodiments, said one or more reducing agents may comprise or may consist of sodium metabisulfite. In some embodiments, said one or more coagulants may comprise or may consist of ferrous chloride and said one or more reducing agents may comprise sodium metabisulfite.

In some embodiments, said method may comprise the following steps: a. adding one or more coagulants, such as ferrous chloride, and one or more reducing agents, such as sodium metabisulfite, to said fluid; b. conditioning the fluid comprising the one or more coagulants and one or more reducing agents; c. adjusting the pH of the fluid to between about 9 to about 10; d. conditioning the fluid following pH adjustment; e. optionally adding one or more flocculants to said fluid; f. allowing the sludge to settle; and g. separating the selenium from the fluid. In some embodiments, step b. may comprise conditioning said fluid for about 5 min. or less, 5 min. or more, 10 min. or more, 15 min. or more, 20 min. or more, 25 min. or more, 30 min. or more, 35 min. or more, 40 min. or more, 45 min. or more, 50 min. or more, 55 min. or more, or 60 min. or more. In some embodiments, step d. may be of a duration sufficient to achieve maximum selenium removal. In some embodiments, step d. may comprise conditioning said fluid for about 5 min. or less, 5 min. or more, 10 min. or more, 15 min. or more, 20 min. or more, 25 min. or more, 30 min. or more, 35 min. or more, 40 min. or more, 45 min. or more, 50 min. or more, 55 min. or more, or 60 min. or more. In some embodiments, a decrease in the duration of time of in conditioning step d. may result in a higher degree of selenium removal as compared to longer relative times, i.e., a method comprising a 5 min. duration conditioning step removes more selenium than a method comprising a 10 min. duration conditioning step. In some embodiments, an increase in the duration of time of conditioning step d. may result in a higher degree of selenium removal as compared to longer relative times, i.e., a method comprising a 30 min. duration conditioning step removes more selenium than a method comprising a 15 min. duration conditioning step. In some embodiments, step d. may comprise conditioning said fluid for about 3-5 min. In some embodiments, steps a.-e. may be effected while agitating said fluid, e.g., agitation is effected by y using a magnetic stirrer. In some embodiments, step e. may comprise the addition of one or more polymer-based flocculants, e.g., one or more polyacrylamide-based flocculants. In some embodiments, step c. may comprise the addition of one or more caustic agents, e.g., wherein the one or more caustic agents may be selected from the group consisting of: lime, sodium sulfide, sodium hydroxide, potassium hydroxide, other caustic substances, and mixtures thereof. In some embodiments, in step g. selenium is separated from the fluid by gravity settling or the use of centrifuges, hydrocyclones, decantation, filtration, thickeners, or other mechanical separation methods. In some embodiments, said one or more flocculants may comprise one or more of the following: one or more polymer-based flocculants; one or more anionic polymer flocculants; one or more nonionic polymer flocculants; one or more high molecular weight anionic or nonionic polymer flocculants; one or more flocculant-grade homopolymers, copolymers, and terpolymers prepared from monomers such as (meth)acrylic acid, (meth)acrylamide, 2-acrylamido-2-methylpropane sulfonic acid, and ethylene oxide; and mixtures thereof. In some embodiments, the dosage of the one or more flocculants may be about 5 ppm or less, 5 ppm or more, 10 ppm or more, 25 ppm or more, 50 ppm or more, 75 ppm or more, or 100 ppm or more. In some embodiments, step b. may increase the degree of selenium removal from said fluid as compared to a method that does not comprise step b. In some embodiments, step f. may comprise allowing the sludge to settle for about 10 min. or more.

In some embodiments, said method may result in removal of about 10% or less, about 10% or more, about 15% or more, about 20% or more, about 25% or more, about 30% or more, about 35% or more, about 40% or more, about 45% or more, about 50% or more, about 55% or more, about 60% or more, about 65% or more, about 70% or more, about 75% or more, about 80% or more, about 85% or more, about 90% or more, about 95% or more, or about 96% or more of selenium from said fluid. In some embodiments, said method may result in removal of an amount of selenium from said fluid such that said fluid meets a desired standard regarding the amount of selenium present in the fluid. In some embodiments, said method may result in a selenium concentration of about 100 ppb or less, about 90 ppb or less, about 80 ppb or less, about 70 ppb or less, about 60 ppb or less, about 50 ppb or less, about 40 ppb or less, about 30 ppb or less, about 20 ppb or less, about 13 ppb or less, about 10 ppb or less, about 5 ppb or less, or about 1 ppb or less. In some embodiments, about 10 ppm or less, 10 ppm or more, 25 ppm or more, 50 ppm or more, 100 ppm or more, 200 ppm or more, 300 ppm or more, 400 ppm or more, 500 ppm or more, 600 ppm or more, 700 ppm or more, 800 ppm or more, 900 ppm or more, 1000 ppm or more, 1250 ppm or more, 1500 ppm or more, 1750 ppm or more, 2000 ppm or more, 2250 ppm or more, 2500 ppm or more, 2750 ppm or more, 3000 ppm or more, 4000 ppm or more, 5000 ppm or more, or 10,000 ppm or more of said one or more coagulants may be added to said fluid. In some embodiments, about 10 ppm or less, 10 ppm or more, 25 ppm or more, 50 ppm or more, 100 ppm or more, 200 ppm or more, 300 ppm or more, 400 ppm or more, 500 ppm or more, 600 ppm or more, 700 ppm or more, 800 ppm or more, 900 ppm or more, 1000 ppm or more, 1250 ppm or more, 1500 ppm or more, 1750 ppm or more, 2000 ppm or more, 2250 ppm or more, 2500 ppm or more, 2750 ppm or more, 3000 ppm or more, 4000 ppm or more, 5000 ppm or more, or 10,000 ppm or more of said one or more reducing agents may be added to said fluid. In some embodiments, the ratio of reducing agent to coagulant (ppm dry reducing agent:ppm dry coagulant) may be between about 0.36 to about 0.48. In some embodiments, use of ferrous chloride and sodium metabisulfite in said method may result in a greater degree of selenium removal as compared to methods comprising the addition of ferrous chloride and sodium hydrosulfide or methods comprising the addition of ferrous chloride and sodium thiosulfite to a fluid in need of treatment. In some embodiments, the use of ferrous chloride and sodium metabisulfite for the removal of selenium from a fluid in need of treatment may result in synergistic effects. In some embodiments, said one or more coagulants and one or more reducing agents may be added simultaneously to said fluid in need of treatment. In some embodiments, addition of one or more reducing agents and one or more coagulants may be sequential. In some embodiments, said one or more reducing agents and/or one or more coagulants may be added to the fluid in need of treatment in one or more doses as needed or in intervals, in a stepwise fashion, or in a continuous fashion. In some embodiments, said fluid in need of treatment may comprise drinking water; ground water; well water; surface water, such as waters from lakes, ponds and wetlands; agricultural waters; wastewater, such as wastewater or leaching water from mining or industrial processes; industrial wastewater; geothermal fluids; and water from mining processes associated with smelting, mine dewatering, tailing impoundment treatment, chemical induced leaching, flotation, autoclave, acid mine drainage, and the like. In some embodiments, said fluid in need of treatment may be produced from a mining process, for example a smelting process, such a smelting process gold, copper, iron, nickel, silver, phosphate, coal or molybdenum; or processes associated with mine dewatering, tailing impoundment treatment, chemical induced leaching, flotation, autoclave, acid mine drainage, and the like. In some embodiments, said fluid in need of treatment may comprise water and one or more oxyanions, such as selenate and/or selenite. In some embodiments, the fluid in need of treatment may comprise selenate and/or selenite. In some embodiments, the fluid in need of treatment may comprise produced water. In some embodiments, the fluid in need of treatment may comprise water used in or derived from gas production and/or gas exploration processes. In some embodiments, the fluid in need of treatment may comprise sea water or other brackish water. In some embodiments, the fluid in need of treatment may comprise boiler water, cooling water, seawater (e.g., in oil platform applications), brackish water, oilfield water, municipal treatment plant water, paper mill water (such as water used to process pulp, paper, and/or cardboard), mining water, water resulting from any part of a method associated with enhanced oil recovery, reverse osmosis process water, water used in geothermal applications or methods, water resulting from gas recovery, water resulting from oil recovery, and/or industrial treatment plant water. In some embodiments, the fluid in need of treatment may comprise a circulating fluid, e.g., wherein said circulating fluid comprises any one or more of the following: a circulating fluid utilized in, or a component of, a mining process, or in a system that is utilized in a mining process; a circulating fluid utilized in, or is a component of, a pulp, paper, and/or cardboard-related process, or is in a system that is utilized in a pulp, paper, and/or cardboard-related process; a circulating fluid utilized in, or a component of a reverse osmosis process; a circulating fluid utilized in, or a component of a geothermal application or method; a circulating fluid utilized in, or a component of, an oil and gas exploration or production process, or in a system that is utilized in an oil and gas exploration and production process; a circulating fluid utilized in, or a component of, coal processing, or in a system that is utilized in coal processing (e.g., coal slurry transport). In some embodiments, the temperature may be about 30° C. or less, 30° C. or more, 35° C. or more, 40° C. or more, 45° C. or more, 50° C. or more, 55° C. or more, 60° C. or more, 65° C. or more, 70° C. or more, 75° C. or more, 80° C. or more, 85° C. or more, 90° C. or more, 95° C. or more, 100° C. or more, 125° C. or more, or 150° C. or more.

Moreover, the present disclosure generally relates to a composition suitable for use in the removal of selenium from a fluid in need of treatment, wherein said composition comprises (i) an effective amount of one or more coagulants, e.g., at least one iron-containing coagulant, and one or more reducing agents, e.g., at least one sodium sulfite-based reducing agent; and (ii) optionally a fluid in need of treatment. In some embodiments, said one or more coagulants may comprise or may consist of iron-containing coagulants. In some embodiments, said one or more coagulants may comprise or may consist of ferrous chloride. In some embodiments, the one or more reducing agents may comprise or may consist of a sodium sulfite-based reducing agent. In some embodiments, said one or more reducing agents may comprise or may consist of sodium metabisulfite. In some embodiments, said one or more coagulants may comprise or may consist of ferrous chloride and said one or more reducing agents may comprise or may consist of sodium metabisulfite. In some embodiments, said composition may further comprise one or more flocculants. In some embodiments, said one or more flocculants may comprise one or more of the following: one or more polymer-based flocculants, one or more anionic polymer flocculants, one or more nonionic polymer flocculants, one or more high molecular weight anionic or nonionic polymer flocculants; one or more flocculant-grade homopolymers, copolymers, and terpolymers prepared from monomers such as (meth) acrylic acid, (meth)acrylamide, 2-acrylamido-2-methylpropane sulfonic acid, and ethylene oxide; and mixtures of any one or more of the foregoing. In some embodiments, said composition may comprise about 5 ppm or less, 5 ppm or more, 10 ppm or more, 25 ppm or more, 50 ppm or more, 75 ppm or more, or 100 ppm or more of said one or more flocculants. In some embodiments, said composition may comprise about 10 ppm or less, 10 ppm or more, 25 ppm or more, 50 ppm or more, 100 ppm or more, 200 ppm or more, 300 ppm or more, 400 ppm or more, 500 ppm or more, 600 ppm or more, 700 ppm or more, 800 ppm or more, 900 ppm or more, 1000 ppm or more, 1250 ppm or more, 1500 ppm or more, 1750 ppm or more, 2000 ppm or more, 2250 ppm or more, 2500 ppm or more, 2750 ppm or more, 3000 ppm or more, 4000 ppm or more, 5000 ppm or more, or 10,000 ppm or more of said one or more coagulants. In some embodiments, said composition may comprise about 10 ppm or less, 10 ppm or more, 25 ppm or more, 50 ppm or more, 100 ppm or more, 200 ppm or more, 300 ppm or more, 400 ppm or more, 500 ppm or more, 600 ppm or more, 700 ppm or more, 800 ppm or more, 900 ppm or more, 1000 ppm or more, 1250 ppm or more, 1500 ppm or more, 1750 ppm or more, 2000 ppm or more, 2250 ppm or more, 2500 ppm or more, 2750 ppm or more, 3000 ppm or more, 4000 ppm or more, 5000 ppm or more, or 10,000 ppm or more of said one or more reducing agents. In some embodiments, the ratio of reducing agent to coagulant (ppm dry reducing agent:ppm dry coagulant) may be between about 0.36 to about 0.48.

In some embodiments, said fluid in need of treatment may comprise drinking water, ground water, well water, surface water, such as waters from lakes, ponds and wetlands, agricultural waters, wastewater, such as wastewater or leaching water from mining or industrial processes, industrial wastewater, geothermal fluids, water from mining processes associated with smelting, mine dewatering, tailing impoundment treatment, chemical induced leaching, flotation, autoclave, acid mine drainage, and the like. In some embodiments, said fluid in need of treatment may be produced from a mining process, for example a smelting process, such a smelting process gold, copper, iron, nickel, silver, phosphate, coal or molybdenum; or processes associated with mine dewatering, tailing impoundment treatment, chemical induced leaching, flotation, autoclave, acid mine drainage, and the like. In some embodiments, said composition may comprise water and one or more oxyanions, such as selenate and/or selenite. In some embodiments, the fluid in need of treatment may comprise selenate, and/or selenite. In some embodiments, the fluid in need of treatment may comprise produced water. In some embodiments, the fluid in need of treatment may comprise water used in or derived from gas production and/or gas exploration processes. In some embodiments, the fluid in need of treatment may comprise sea water or other brackish water. In some embodiments, the fluid in need of treatment may comprise boiler water, cooling water, seawater (e.g., in oil platform applications), brackish water, oilfield water, municipal treatment plant water, paper mill water (such as water used to process pulp, paper, and/or cardboard), mining water, water resulting from any part of a method associated with enhanced oil recovery, reverse osmosis process water, water used in geothermal applications or methods, water resulting from gas recovery, water resulting from oil recovery, and/or industrial treatment plant water. In some embodiments, the fluid in need of treatment may comprise a circulating fluid, e.g., wherein said circulating fluid comprises any one or more of the following: a circulating fluid utilized in, or a component of, a mining process, or in a system that is utilized in a mining process; a circulating fluid utilized in, or is a component of, a pulp, paper, and/or cardboard-related process, or is in a system that is utilized in a pulp, paper, and/or cardboard-related process; a circulating fluid utilized in, or a component of a reverse osmosis process; a circulating fluid utilized in, or a component of a geothermal application or method; a circulating fluid utilized in, or a component of, an oil and gas exploration or production process, or in a system that is utilized in an oil and gas exploration and production process; a circulating fluid utilized in, or a component of, coal processing, or in a system that is utilized in coal processing (e.g., coal slurry transport).

DETAILED DESCRIPTION

Definitions

As used herein the singular forms "a", "an", and "the" include plural referents unless the context clearly dictates otherwise. All technical and scientific terms used herein have the same meaning as commonly understood to one of ordinary skill in the art to which this invention belongs unless clearly indicated otherwise.

As used herein, the term "enhanced oil recovery" or "EOR" (sometimes also known as improved oil recovery ("IOR") or tertiary mineral oil production) generally refers to techniques for increasing the amount of unrefined petroleum (for example, crude oil) that may be extracted from an oil reservoir, such as an oil field. Examples of EOR techniques include, for example, miscible gas injection (e.g., carbon dioxide flooding), chemical injection, which is sometimes referred to as chemical enhanced oil recovery ("CEOR"), and which includes, for example, polymer flooding, alkaline flooding, surfactant flooding, micellar polymer flooding, conformance control operations, as well as combinations thereof such as alkaline-polymer flooding or alkaline-surfactant-polymer flooding, microbial injection, and thermal recovery (e.g., cyclic steam, steam flooding, or fire flooding). In some embodiments, the EOR operation may include a polymer ("P") flooding operation, an alkaline-polymer ("AP") flooding operation, a surfactant-polymer ("SP") flooding operation, an alkaline-surfactant-polymer ("ASP") flooding operation, a conformance control operation, or any combination thereof.

As used herein, the terms "polymer flood" or "polymer flooding" generally refer to a chemical enhanced EOR technique that typically involves injecting an aqueous fluid that is viscosified with one or more water-soluble polymers through injection boreholes into an oil reservoir to mobilize oil left behind after primary and/or secondary recovery. As a general result of the injection of one or more polymers, the oil may be forced in the direction of the production borehole, and the oil may be produced through the production borehole. Details of examples of polymer flooding and of polymers suitable for this purpose are disclosed, for example, in "Petroleum, Enhanced Oil Recovery, Kirk-Othmer, Encyclopedia of Chemical Technology, online edition, John Wiley & Sons, 2010", which is herein incorporated by reference in its entirety. One or more surfactants may be injected (or formed in situ) as part of the EOR technique. Surfactants may function to reduce the interfacial tension between the oil and water, which may reduce capillary pressure and improve mobilization of oil. Surfactants may be injected with polymers (e.g., a surfactant-polymer (SP) flood), or formed in-situ (e.g., an alkaline-polymer (AP) flood), or a combination thereof (e.g., an alkaline-surfactant-polymer (ASP) flood). As used herein, the terms "polymer flood" and "polymer flooding" encompass all of these EOR techniques.

As used herein, the term "monomer" generally refers to nonionic monomers, anionic monomers, cationic monomers, zwitterionic monomers, betaine monomers, and amphoteric ion pair monomers.

As used herein, the terms "polymer", "polymers", "polymeric", and similar terms are used in their ordinary sense as understood by one skilled in the art, and thus may be used herein to refer to or describe a large molecule (or group of such molecules) that may comprise recurring units. Polymers may be formed in various ways, including by polymerizing monomers and/or by chemically modifying one or more recurring units of a precursor polymer. Unless otherwise specified, a polymer may comprise a "homopolymer" that may comprise substantially identical recurring units that may be formed by, e.g., polymerizing, a particular monomer. Unless otherwise specified, a polymer may also comprise a "copolymer" that may comprise two or more different recurring units that may be formed by, e.g., copolymerizing, two or more different monomers, and/or by chemically modifying one or more recurring units of a precursor polymer. Unless otherwise specified, a polymer or copolymer may also comprise a "terpolymer" that may comprise polymers that may comprise three or more different recurring units. The term "polymer" as used herein is intended to include both the acid form of the polymer as well as its various salts. Polymers may be amphoteric in nature, i.e., containing both anionic and cationic substituents, although not necessarily in the same proportions. Unless otherwise specified, the term "copolymer" includes random, block, and graft copolymers.

As used herein the term "nonionic monomer" generally refers to a monomer that possesses a neutral charge. Nonionic monomers may comprise but are not limited to comprising monomers selected from the group consisting of acrylamide ("AMD"), acrylic, methacrylic, methacrylamido, vinyl, allyl, ethyl, and the like, all of which may be substituted with a side chain selected from, for example, an alkyl, arylalkyl, dialkyl, ethoxyl, and/or hydrophobic group. In some embodiments, a nonionic monomer may comprise AMD. In some embodiments, nonionic monomers may comprise but are not limited to comprising vinyl amide (e.g., acrylamide, methacrylamide, N-methylacrylamide, N,N-dimethylacrylamide), acryloylmorpholine, acrylate, maleic anhydride, N-vinylpyrrolidone, vinyl acetate, N-vinyl formamide and their derivatives, such as hydroxyethyl (methyl) acrylate CH2=CR—COO—CH2CH2OH (I) and CH2=CR—CO—N(Z1)(Z2) (2)N-substituted (methyl) acrylamide (II). R=H or Me; Z1=5-15C alkyl; 1-3C alkyl substituted by 1-3 phenyl, phenyl or 6-12C cycloalkyl (both optionally substituted) and Z2=H; or Z1 and Z2 are each 3-10C alkyl; (II) is N-tert. hexyl, tert. octyl, methylundecyl, cyclohexyl, benzyl, diphenylmethyl or triphenyl acrylamide. Nonionic monomers further may include dimethylaminoethylacrylate ("DMAEMA"), dimethylaminoethyl methacrylate ("DMAEM"), N-isopropylacrylamide and N-vinyl formamide. Nonionic monomers can be combined, for example, to form a terpolymer of acrylamide, N-vinyl formamide, and acrylic acid.

As used herein, the term "anionic monomers" may refer to either anionic monomers that are substantially anionic in whole or (in equilibrium) in part, at a pH in the range of about 4.0 to about 9.0. The "anionic monomers" may be neutral at low pH (from a pH of about 2 to about 6), or anionic at low pH.

Examples of anionic monomers which may be used herein which further may be substituted with other groups include but are not limited to those comprising acrylamide ("AMD"), acrylic, methacrylic, methacrylamido, vinyl, allyl, ethyl, and the like; maleic monomers and the like; calcium diacrylate; and/or any monomer substituted with a carboxylic acid group or salt thereof. In some embodiments, these anionic monomers may be substituted with a carboxylic acid group, and include, for example, acrylic acid, and methacrylic acid. In some embodiments, an anionic monomer which may be used herein may be a (meth)acrylamide monomer wherein the amide group has been hydrolyzed to a carboxyl group. Said monomer may be a derivative or salt of a monomer according to the embodiments. Additional examples of anionic monomers comprise but are not limited to those comprising sulfonic acids or a sulfonic acid group, or both. In some embodiments, the anionic monomers which may be used herein may comprise a sulfonic function that may comprise, for example, acrylamide tertiary butyl sulfonic acid (also known as 2-acrylamido-2-methylpropane sulfonic acid or N-t-butyl acrylamide sulfonic acid) ("ATBS"); vinylsulfonic acid; 4-styrenesulfonic acid; and/or any salts of any of these moieties/monomers. In some embodiments, anionic monomers may comprise organic acids. In some embodiments, anionic monomers may comprise acrylic acid, methacrylic acid, maleic acid, itaconic acid, acrylamido methylpropane sulfonic acid, vinylphosphonic acid, styrene sulfonic acid and their salts such as sodium, ammonium and potassium. Anionic monomers can be combined, for example, to form a terpolymer of acrylamide, acrylic acid and acrylamide tertiary butyl sulfonic acid.

As used herein, the term "cationic monomer" generally refers to a monomer that possesses a positive charge. Examples of cationic monomers may comprise but are not limited to those comprising acryloyloxy ethyl trimethyl ammonium chloride ("AETAC"), methacryloyloxyethyltrimethylammonium chloride, methacrylamidopropyltrimethylammonium chloride ("MAPTAC"), acrylamidopropyltrimethylammonium chloride, methacryloyloxyethyldimethylammonium sulfate, dimethylaminoethyl acrylate, dimethylaminopropylmethacrylamide, Q6, Q6o4, and/or diallyldimethylammonium chloride ("DADMAC").

Said cationic monomers may also comprise but are not limited to comprising dialkylaminoalkyl acrylates and methacrylates and their quaternary or acid salts, including, but not limited to, dimethylaminoethyl acrylate methyl chloride quaternary salt ("DMAEA·MCQ"), dimethylaminoethyl acrylate methyl sulfate quaternary salt ("DMAEM·MCQ"), dimethyaminoethyl acrylate benzyl chloride quaternary salt ("DMAEA·BCQ"), dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkylammonium halides such as diallyldiethylammonium chloride and diallyldimethyl ammonium chloride. Alkyl groups may generally but are not limited to those comprising $C_{1-8}$ alkyl groups. In some embodiments, cationic monomers may comprise quaternary ammonium or acid salts of vinyl amide, vinyl carboxylic acid, methacrylate and their derivatives. Cationic monomers may comprise but are not limited to comprising monomers selected from the group consisting of dimethylaminoethylacrylate methyl chloride quaternary salt, dimethylaminoethylmethacrylate methyl chloride quaternary salt, and diallyldimethyl ammonium chloride. Cationic monomers can be combined, for example, to form a terpolymer of dimethylaminoethylmethacrylate methyl chloride quaternary salt, and diallyldimethyl ammonium chloride and acrylamide.

As used herein, the terms "polyacrylamide" or "PAM" generally refer to polymers and copolymers comprising acrylamide moieties, and the terms encompass any polymers or copolymers comprising acrylamide moieties, e.g., one or more acrylamide (co)polymers. Furthermore, PAMs may comprise any of the polymers or copolymers discussed herein. Additionally, PAMs, e.g., one or more acrylamide (co)polymers, may be provided in one of various forms, including, for example, dry (powder) form (e.g., DPAM), water-in-oil emulsion (inverse emulsion), suspension, dispersion, or partly hydrolyzed (e.g., HPAM, in which some of the acrylamide units have been hydrolyzed to acrylic acid). In some embodiments, PAMs, e.g., one or more acrylamide (co)polymers, may be used for polymer flooding. In some embodiments, PAMs, e.g., one or more acrylamide (co) polymers, may be used as flocculants. In some embodiments, PAMS, e.g., one or more acrylamide (co)polymers, may be used in any EOR technique, e.g., as a flocculant. In some embodiments, a polyacrylamide may be a cationic polyacrylamide (cPAM).

As used herein, the term "produced water" generally refers to any aqueous fluids produced during any type of industrial process, e.g., an oil or gas extraction or recovery process, or any portion thereof, such as but not limited to any enhanced oil recovery process or any portion thereof wherein the produced water comprises one or more polymers, e.g., one or more water-soluble polymers. Produced water may also be generated by mining operations. Typically the produced water may be obtained during an industrial process involving the use of water, generally copious amounts of water, and, optionally, the use of one or more water soluble polymers, e.g., viscosifying or thickening polymers, wherein the end product of such industrial process may be an aqueous material or "produced water." In some embodiments, produced water may comprise metals or oxyanions. In some embodiments, produced water may comprise selenium.

According to some embodiments, the produced water may be formed during any part of a process related to polymer flooding and may comprise any components and/or chemicals related to any part of said polymer flooding. This may be referred to as "polymer flooded produced water" or "polymer flooding produced water", and the term produced water is to be understood to encompass any type of polymer flooded produced water or polymer flooding produced water. Produced water may be anoxic produced water. Produced water may be anaerobic produced water or may be aerobic produced water.

The term "water-soluble polymer" generally refers to any polymer that may dissolve, disperse, or swell in water. Said polymers may modify the physical properties of aqueous systems undergoing gellation, thickening, viscosification, or emulsification/stabilization. Said polymers may perform a variety of functions, including but not limited to use as dispersing and suspending agents, stabilizers, thickeners ("thickening polymer" and/or "thickening agent"), viscosifiers ("viscosifying polymer" and/or "viscosifying agent"), gellants, flocculants and coagulants, film-formers, humectants, binders, and lubricants.

As used herein, the term "flocculant" generally refers to a reagent that may bridge neutralized or coagulated particles into larger agglomerates, typically resulting in more efficient settling. In some embodiments, the flocculant may comprise any one or more of the polymers discussed herein, for example, one or more polymers comprising one or more anionic, one or more cationic, and/or one or more nonionic monomers. In some embodiments, the flocculant may comprise one or more polyacrylamide-based polymers. In some embodiments, one or more flocculants may have a low molecular weight, a medium molecular weight, and/or a high molecular weight. In some embodiments, one or more flocculants may comprise a charged flocculant that may have a low charge, a medium charge, and/or a high charge.

As used herein, the term "metal" generally refers to both elements that may be considered metals, such as iron, and compounds comprising one or more metals, such as, for example, ferrous chloride.

As used herein, the term "iron" generally refers to any form of iron, for example, iron of any isotopic state, iron of any oxidation state, any form of an iron compound, such as, for example, iron (III) chloride, iron (II) chloride (also known as ferrous chloride), iron (III) chloride hexahydrate, and iron sulfate. In some embodiments, iron may comprise iron (II).

As used herein, the term "selenium" generally refers to any form of selenium, such as, for example, selenium of any isotopic state, selenium of any oxidation state, and/or any form of a compound comprising selenium.

As used herein, the term "coagulant" generally refers to an agent that may destabilize colloidal suspensions. Coagulants may comprise iron-containing coagulants i.e., any one or more coagulants that comprise iron, such as, for example, ferrous chloride. Examples of iron-containing coagulants may include, but are not limited to including, ferrous chloride, ferric chloride, ferric chloride sulfate, iron chloride, iron sulfate, ferric sulfate, ferrous sulfate, and polyferric sulfate. In some embodiments, an iron-containing coagulant may comprise ferrous chloride and/or iron chloride. Additional coagulants may include but are not limited to including inorganic coagulants such as aluminium sulfate ("ALS") and other metal sulfates, organic coagulants such as polyamines and polyDADMACs, cationic polyacrylamides (cPAMs) of various different molecular weights and charges, and other inorganic and organic coagulants known in the art. Furthermore, a coagulant may comprise a poly(diallyldimethyl ammonium chloride) ("polyDADMAC") compound; an epi-polyamine compound; a polymer that may comprise one or more quaternized ammonium groups, such as acryloyloxyethyltrimethylammonium chloride, methacryloyloxyethyltrimethylammonium chloride, methacrylamidopropyltrimethylammonium chloride, acrylamidopropyltrimethylammonium chloride; or a mixture thereof. An inorganic coagulant may, for example, reduce, neutralize or invert electrical repulsions between particles. Inorganic coagulants may comprise but are not limited to inorganic salts such as aluminum chloride, aluminum sulfate, aluminum chlorohydrate, polyaluminum chloride, polyaluminum silica sulfate, ferric chloride, ferrous chloride, ferric sulfate, ferric chloride sulfate, polyferric sulfate, ferrous sulfate, lime, calcium chloride, calcium sulfate, magnesium chloride, sodium aluminate, various commercially available iron or aluminum salts coagulants, or combinations thereof. In some embodiments, a coagulant may comprise a combination or mixture of one or more organic coagulants with one or more inorganic coagulants. In some embodiments, a coagulant may comprise a combination or mixture of any of the above coagulants. In some embodiments, a coagulant may comprise an iron-containing coagulant, i.e., any one or more coagulants that comprise iron, such as, for example, ferrous chloride. In some embodiments, a composition comprising one or more coagulants, e.g., at least one iron-containing coagulant, e.g., ferrous chloride, and one or more reducing agents, e.g., at least one sodium sulfite-based reducing agent, e.g., sodium metabisulfite, may be used in methods for removing selenium from a fluid in need of treatment, e.g., a fluid comprising selenium.

As used herein, the term "reducing agent" generally refers to an element or compound that loses (or "donates") an electron to another chemical species in a chemical reaction, e.g., a redox reaction. In some embodiments, a reducing agent may comprise bisulfite, metabisulfite, sulfite, sulfur dioxide, and/or hydrated sulfur dioxide. In some embodiments, a reducing agent may comprise compounds such as sulfites, bisulfites, metabisulfites (and in particular metabisulfite). In some embodiments, a reducing agent may comprise one or more sodium sulfite-based reducing agents, e.g., sodium sulfite, sodium bisulfite, and/or sodium metabisulfite, In some embodiments, a reducing agent may comprise hydrazine and/or its hydroxylamine derivatives or a mixture of sodium borohydride and bisulfite. In some embodiments, a reducing agent may comprise organic sulfites such as alkyl sulfites, alkyl hydrosulfites, sulfinates, sulfoxylates, phosphites, and also oxalic or formic acid or salts of erythorbate and carbohydrazides. In some embodiments, a reducing agent may comprise an oxygen scavenger such as, but not limited to, carbohydrazide, hydroquinone, diethylhydroxylamine (DEHA), methyl ethyl ketoxime (MEKO), and/or erythorbate. In some embodiments, a reducing agent may comprise the salt form of any compound that may be considered a reducing agent, e.g., sodium metabisulfite. In some embodiments, the reducing agent may be any of a variety of reducing agents known to those of skill in the art, for example metal hydrides such as sodium borohydride, lithium aluminum hydride, and diisobutylaluminum hydride; zinc metal; iron metal; sodium sulfide; and bisulfite. In some embodiments, a composition comprising one or more coagulants, e.g., at least one iron-containing coagulant, e.g., ferrous chloride, and one or more reducing agents, e.g., at least one sodium sulfite-based reducing agent, e.g., sodium metabisulfite, may be used in methods for removing selenium from a fluid in need of treatment, e.g., a fluid comprising selenium.

As used here, the terms "oxyanion" and "oxoanion" generally refer to a chemical compound of the formula $A_xO_y^z$ (where A represents a chemical element and O represents an oxygen atom). Oxyanions can be formed by many chemical elements. Oxyanions include, for example, borate, carbonate, nitrate, phosphate, sulfate, chromate, arsenate, selenate, molybdate, nitrite, phosphate, sulfite, arsenite, selenite, hypophosphite, phosphate, hyposulfite, perchlorate, perbromate, periodate, permanganate, chlorate, chromate, bromate, iodate, chlorite, bromite, hypochlorite, and hypobromite. In some embodiments, the oxyanion may comprise selenium. In some embodiments, the oxyanion may be selenate. In some embodiments, the oxyanion may be selenite. In some embodiments, the oxyanions may be a mixture of oxyanions. In some embodiments, the oxyanions may be a mixture comprising selenium, selenate, and/or selenite.

As used herein, the term "sludge" generally refers to a mixture of liquid and solid components, which may be viscous or non-viscous, and which may comprise oil, water, and/or sediment. In some embodiments, produced water may comprise sludge. In some embodiments, produced water comprising sludge may result from enhanced oil recovery. In some embodiments, a fluid in need of treatment may comprise sludge.

As used herein, the term "effluent" generally refers to treated or untreated wastewater that may be discharged from a treatment plant, sewer, or industrial outfall. Sometimes, effluent may refer to wastes discharged into surface waters. Effluent may generally refer to treated or untreated produced water, i.e., produced water resulting from one or more processes related to enhanced oil recovery. Effluent may generally refer to a fluid in need of treatment.

As used herein, the term "fluid in need of treatment" generally refers to any fluid and/or aqueous liquid feed that contains undesirable amounts of metals and/or oxyanions, e.g., comprises undesirable amounts of selenium and/or selenate and/or selenite. In some embodiments, a fluid in need of treatment may include, but is not limited to including, drinking water, ground water, well water, surface water, such as waters from lakes, ponds and wetlands, agricultural waters, wastewater, such as wastewater or leaching water from mining or industrial processes, industrial wastewater, geothermal fluids, water from mining processes associated with smelting, mine dewatering, tailing impoundment treatment, chemical induced leaching, flotation, autoclave, acid mine drainage, and the like. In some embodiments, the fluid in need of treatment may be produced from a mining process, for example a smelting process, such a smelting process gold, copper, iron, nickel, silver, phosphate, coal or molybdenum; or processes associated with mine dewatering, tailing impoundment treatment, chemical induced leaching, flotation, autoclave, acid mine drainage, and the like. In some embodiments, the fluid in need of treatment may comprise water and one or more oxyanions. In some embodiments, the fluid in need of treatment may comprise selenium, selenate, and/or selenite. In some embodiments, a fluid in need of treatment may comprise produced water. In some embodiments, a fluid in need of treatment may comprise water used in or derived from gas production and/or gas exploration processes. In some embodiments, a fluid in need of treatment may comprise sea water or other brackish water. In some embodiments, a fluid in need of treatment may comprise boiler water, cooling water, seawater (e.g., in oil platform applications), brackish water, oilfield water, municipal treatment plant water, paper mill water (such as water used to process pulp, paper, and/or cardboard), mining water, water resulting from any part of a method associated with enhanced oil recovery, reverse osmosis process water, water used in geothermal applications or methods, water resulting from gas recovery, water resulting from oil recovery, and/or industrial treatment plant water. In some instances, a fluid in need of treatment may comprise a circulating fluid. In some embodiments, the circulating fluid may be utilized in, or may be a component of, a mining process, or may be in a system that is utilized in a mining process. In some embodiments, the circulating fluid may be utilized in, or may be a component of, a pulp, paper, and/or cardboard-related process, or may be in a system that is utilized in the processing of pulp, paper, and/or cardboard. In some embodiments, the circulating fluid may be utilized in, or may be a component of, an oil and gas exploration or production process, or may be in a system that is utilized in an oil and gas exploration and production process. In some embodiments, the circulating fluid may be utilized in, or may be a component of, coal processing, or may be in a system that is utilized in coal processing (e.g., coal slurry transport). In some embodiments, the circulating fluid may be utilized in, or may be a component of a reverse osmosis process. In some embodiments, the circulating fluid may be utilized in, or may be a component of a geothermal application or method.

As used herein, the term "removing selenium", the like, generally refers to use of the compositions and methods described herein to effect a reduction and/or removal of at least some to all of the selenium, inclusive of any form of and/or compound comprising selenium, comprised in a fluid in need of treatment.

Methods and Compositions

Disclosed herein are methods and compositions for removing selenium from a fluid in need of treatment. Further disclosed herein are fluids in need of treatment, i.e., those in which selenium removal is desired, examples of which include, for example, industrial wastewaters, produced water, and water resulting from and/or used in conjunction with mining processes. In some embodiments, a method for removing selenium from a fluid in need of treatment may comprise adding one or more coagulants, e.g., at least one iron-containing coagulant, e.g., ferrous chloride, and one or more reducing agents, e.g., at least one sodium sulfite-based reducing agent, e.g., sodium metabisulfite, in an amount effective to reduce the amount of and/or remove at least a portion of the selenium from said fluid in need of treatment. In some embodiments, said one or more coagulants may comprise or consist of iron-containing coagulants, In some embodiments, said one or more reducing agents may comprise or consist of sodium sulfite-based reducing agents. In some embodiments, said one or more reducing agents may comprise or consist of sodium metabisulfite. In some embodiments, a method for removing selenium from a fluid in need of treatment may comprise adding ferrous chloride and sodium metabisulfite to said fluid in an amount effective to reduce the amount of and/or remove at least a portion of said selenium from said fluid. In some embodiments, a method for removing selenium from a fluid in need of treatment may comprise: a. adding one or more coagulants, e.g., at least one iron-containing coagulant, e.g., ferrous chloride, and one or more reducing agents, e.g., at least one sodium sulfite-based reducing agent, e.g., sodium metabisulfite, to said fluid; b. conditioning the fluid comprising the one or more coagulants and one or more reducing agents; c. adjusting the pH of the fluid to between about 9 to about 10; d. conditioning the solution following pH adjustment; e. optionally adding one or more flocculants to said fluid; f. allowing the sludge to settle; and g. separating the selenium from the treated fluid. In some embodiments, step b. may comprise conditioning said fluid for about 5 min. or less to about 60 min. or more. In some embodiments, step b. may comprise conditioning said fluid for about 5 min. or less, 5 min. or more, 10 min. or more, 15 min. or more, 20 min. or more, 25 min. or more, 30 min. or more, 35 min. or more, 40 min. or more, 45 min. or more, 50 min. or more, 55 min. or more, or 60 min. or more, In some embodiments, step d. may be of a duration sufficient to achieve maximum selenium removal. In some embodiments, step. d. may comprise conditioning said fluid for about 5 min. or less to about 60 min. or more. In some embodiments, step d. may comprise conditioning said fluid for about 5 min. or less, 5 min. or more, 10 min. or more, 15 min. or more, 20 min. or more, 25 min. or more, 30 min. or more, 35 min. or more, 40 min. or more, 45 min. or more, 50 min. or more, 55 min. or more, or 60 min. or more. In some embodiments, a decrease in the duration of time of conditioning in step d. may result in a higher degree of selenium removal as compared to longer relative times, i.e., a method comprising a 5 min. duration conditioning step removes more selenium than a method comprising a 10 min. duration conditioning step. In some embodiments, an increase in the duration of time of conditioning step d. may result in a higher degree of selenium removal as compared to longer relative times, i.e., a method comprising a 30 min. duration conditioning step removes more selenium than a method comprising a 15 min. duration conditioning step. In some embodiments, step d. may comprise conditioning said fluid for about 3 min. or less to about 5 min. or more. In some embodiments, steps a.-e. may be effected while agitating said fluid, such as by using magnetic stirrer. In some embodiments, step c. may comprise the addition of one or more caustic agents, such as, for example, lime, sodium sulfide, sodium hydroxide, potassium hydroxide, other caustic substances, or mixtures thereof to effect the pH adjustment. In some embodiments, step g. may comprise any separation method or means known to those skilled in the art, including but not limited to gravity settling, centrifuges, hydrocyclones, decantation, filtration, thickeners, or another mechanical separation methods. In some embodiments, step b. may increase the degree of selenium removal from said fluid as compared to a method that does not comprise step b. In some embodiments, step f. may comprise allowing the sludge to settle for about 10 min. or more.

In some embodiments, step e. may be included in said method. Any suitable flocculant or mixture of flocculants may be used in the methods described herein. In some embodiments, the one or more flocculants added to the fluid in need of treatment may comprise one or more polymer flocculants, e.g., one or more polyacrylamide-based flocculants. In some embodiments, the polymer flocculants may be anionic or nonionic. Any high molecular weight anionic or nonionic polymer flocculants known in the art may be used in the methods described herein. Nonlimiting examples of polymer flocculants include, for example, flocculant-grade homopolymers, copolymers, and terpolymers prepared from monomers such as (meth)acrylic acid, (meth)acrylamide, 2-acrylamido-2-methylpropane sulfonic acid, and ethylene oxide. In some embodiments, the polymer flocculant may be an anionic polymer. In some embodiments, the polymer flocculant may be a nonionic polymer. In some embodiments, the polymer flocculant may be a mixture of anionic polymers and nonionic polymers. In some embodiments, the one or more flocculants may comprise a polyacrylamide-based flocculant. In some embodiments, the dosage of the one or more flocculants may be any dosage that will achieve a necessary or desired result. In some embodiments, the dosage of the one or more flocculants may be about 5 ppm or less, 5 ppm or more, 10 ppm or more, 25 ppm or more, 50 ppm or more, 75 ppm or more, or 100 ppm or more.

In some embodiments, a method for removing selenium from a fluid in need of treatment may result in removal of about 10% or less, about 10% or more, about 15% or more, about 20% or more, about 25% or more, about 30% or more, about 35% or more, about 40% or more, about 45% or more, about 50% or more, about 55% or more, about 60% or more, about 65% or more, about 70% or more, about 75% or more, about 80% or more, about 85% or more, about 90% or more, about 95% or more, or about 96% or more of said selenium from said fluid. In some embodiments, a method for removing selenium from a fluid in need of treatment may result in removal of a desired amount of selenium from said fluid. In some embodiments, a method for removing selenium from a fluid in need of treatment may result in removal of an amount of selenium from said fluid such that said fluid meets a desired standard regarding the amount of selenium present in the fluid. In some embodiments, a method for removing selenium from a fluid in need of treatment may comprise addition of an amount of one or more coagulants, e.g., at least one iron-containing coagulant, e.g., ferrous chloride, and one or more reducing agents, e.g., at least one sodium sulfite-based reducing agent, e.g., sodium metabisulfite, that results in a desired amount of removal of selenium from said fluid. In some embodiments, a method for removing selenium from a fluid in need of treatment may result in a selenium concentration of about 100 ppb or less, about 90 ppb or less, about 80 ppb or less, about 70 ppb or less, about 60 ppb or less, about 50 ppb or less, about 40 ppb or less, about 30 ppb or less, about 20 ppb or less, about 13 ppb or less, about 10 ppb or less, about 5 ppb or less, or about 1 ppb or less.

In some embodiments, a method for removing selenium from a fluid in need of treatment may comprise addition of about 10 ppm or less, 10 ppm or more, 25 ppm or more, 50 ppm or more, 100 ppm or more, 200 ppm or more, 300 ppm or more, 400 ppm or more, 500 ppm or more, 600 ppm or more, 700 ppm or more, 800 ppm or more, 900 ppm or more, 1000 ppm or more, 1250 ppm or more, 1500 ppm or more, 1750 ppm or more, 2000 ppm or more, 2250 ppm or more, 2500 ppm or more, 2750 ppm or more, 3000 ppm or more, 4000 ppm or more, 5000 ppm or more, or 10,000 ppm or more of one or more coagulants, e.g., at least one iron-containing coagulant, e.g., ferrous chloride. In some embodiments, a method for removing selenium from a fluid in need of treatment may comprise addition of about 10 ppm or less, 10 ppm or more, 25 ppm or more, 50 ppm or more, 100 ppm or more, 200 ppm or more, 300 ppm or more, 400 ppm or more, 500 ppm or more, 600 ppm or more, 700 ppm or more, 800 ppm or more, 900 ppm or more, 1000 ppm or more, 1250 ppm or more, 1500 ppm or more, 1750 ppm or more, 2000 ppm or more, 2250 ppm or more, 2500 ppm or more, 2750 ppm or more, 3000 ppm or more, 4000 ppm or more, 5000 ppm or more, or 10,000 ppm or more of one or more reducing agents, e.g., at least one sodium sulfite-based reducing agent, e.g., sodium metabisulfite. In some embodiments, a method for removing selenium from a fluid in need of treatment may comprise addition of one or more coagulants, e.g., at least one iron-containing coagulant, e.g., ferrous chloride, and one or more reducing agents, e.g., at least one sodium sulfite-based coagulant, e.g., sodium metabisulfite, wherein the ratio of reducing agent to coagulant (ppm dry reducing agent:ppm dry coagulant) is between about 0.36 to about 0.48. In some embodiments, the amounts of one or more coagulants and one or more reducing agents to be added to a fluid in need of treatment to effect a method for selenium removal may be based on the amount of selenium present in said fluid in need of treatment.

In some embodiments, a method for removing selenium from a fluid in need of treatment may comprise addition of ferrous chloride and sodium metabisulfite to said fluid, and use of ferrous chloride and sodium metabisulfite in said method may result in a greater degree of selenium removal as compared to methods comprising the addition of ferrous chloride and sodium hydrosulfide or methods comprising the addition of ferrous chloride and sodium thiosulfite. In some embodiments, a method for removing selenium from a fluid in need of treatment may comprise addition of ferrous chloride and sodium metabisulfite to said fluid, and use of ferrous chloride and sodium metabisulfite in said method may result in a greater degree of selenium removal as compared to method comprising the use of coagulants and reducing agents other than ferrous chloride and sodium metabisulfite, respectively.

In some embodiments, use of one or more iron-containing coagulants, e.g., ferrous chloride, and one or more sodium sulfite-based reducing agents, e.g., sodium metabisulfite, for the removal of selenium from a fluid in need of treatment may result in synergistic effects. In some embodiments, a method for removing selenium from a fluid in need of treatment may comprise addition of one or more coagulants and one or more reducing agents simultaneously to said fluid in need of treatment. In some embodiments, a method for removing selenium from a fluid in need of treatment may comprise sequential addition of one or more reducing agents and one or more coagulants. In some embodiments, one or more reducing agents and/or one or more coagulants may be added to the fluid in need of treatment in one or more doses as needed or in intervals, in a stepwise fashion, or in a continuous fashion.

A broad variety of fluids in need of treatment may be treated using the methods described herein to effect removal of and/or reduction of the amount of selenium in said fluids. Non-limiting examples of such fluids in need of treatment, include, but are not limited to including, drinking water, ground water, well water, surface water, such as waters from lakes, ponds and wetlands, agricultural waters, wastewater, such as wastewater or leaching water from mining or industrial processes, industrial wastewater, geothermal fluids, water from mining processes associated with smelting, mine dewatering, tailing impoundment treatment, chemical induced leaching, flotation, autoclave, acid mine drainage, and the like. In some embodiments, the fluid in need of treatment may be produced from a mining process, for example a smelting process, such a smelting process gold, copper, iron, nickel, silver, phosphate, coal or molybdenum; or processes associated with mine dewatering, tailing impoundment treatment, chemical induced leaching, flotation, autoclave, acid mine drainage, and the like. In some embodiments, the fluid in need of treatment may comprise water and one or more oxyanions. In some embodiments, the fluid in need of treatment may comprise selenium, selenate, and/or selenite. In some embodiments, a fluid in need of treatment may comprise produced water. In some embodiments, a fluid in need of treatment may comprise water used in or derived from gas production and/or gas exploration processes. In some embodiments, a fluid in need of treatment may comprise sea water or other brackish water. In some embodiments, a fluid in need of treatment may comprise boiler water, cooling water, seawater (e.g., in oil platform applications), brackish water, oilfield water, municipal treatment plant water, paper mill water (such as water used to process pulp, paper, and/or cardboard), mining water, water resulting from any part of a method associated with enhanced oil recovery, reverse osmosis process water, water used in geothermal applications or methods, water resulting from gas recovery, water resulting from oil recovery, and/or industrial treatment plant water. In some instances, a fluid in need of treatment may comprise a circulating fluid. In some embodiments, the circulating fluid may be utilized in, or may be a component of, a mining process, or may be in a system that is utilized in a mining process. In some embodiments, the circulating fluid may be utilized in, or may be a component of, a pulp, paper, and/or cardboard-related process, or may be in a system that is utilized in the processing of pulp, paper, and/or cardboard. In some embodiments, the circulating fluid may be utilized in, or may be a component of, an oil and gas exploration or production process, or may be in a system that is utilized in an oil and gas exploration and production process. In some embodiments, the circulating fluid may be utilized in, or may be a component of, coal processing, or may be in a system that is utilized in coal processing (e.g., coal slurry transport). In some embodiments, the circulating fluid may be utilized in, or may be a component of a reverse osmosis process. In some embodiments, the circulating fluid may be utilized in, or may be a component of a geothermal application or method.

In some embodiments, methods for removing selenium from a fluid in need of treatment may be conducted at any desired temperature. In some instances, the method may be conducted at atmospheric temperature. In some instances, method may be conducted at a temperature of about 30° C. or less, 30° C. or more, 35° C. or more, 40° C. or more, 45° C. or more, 50° C. or more, 55° C. or more, 60° C. or more, 65° C. or more, 70° C. or more, 75° C. or more, 80° C. or more, 85° C. or more, 90° C. or more, 95° C. or more, 100° C. or more, 125° C. or more, or 150° C. or more.

In some embodiments, selenium that has been removed from a fluid in need of treatment may be handled or processed in any manner as necessary or desired. In some embodiments, the selenium removed from a fluid in need of treatment should be handled in compliance with governmental regulations. In some embodiments, selenium removed from a fluid in need of treatment may be disposed of, or sent to a landfill.

Moreover, the present disclosure generally relates to a composition suitable for use in the removal of selenium from a fluid in need of treatment, wherein said composition comprises (i) an effective amount of one or more coagulants, e.g., at least one iron-containing coagulant, e.g., ferrous chloride, and one or more reducing agents, e.g., at least one sodium sulfite-based reducing agent, e.g., sodium metabisulfite; and (ii) optionally a fluid in need of treatment. In some embodiments, said one or more coagulants may comprise or consist of iron-containing coagulants. In some embodiments, said one or more coagulants may comprise or consist of ferrous chloride. In some embodiments, said one or more reducing agents may comprise or consist of a sodium sulfite-based reducing agent. In some embodiments, said one or more reducing agents may comprise or consist of sodium metabisulfite. In some embodiments, said one or more coagulants may comprise or consist of ferrous chloride and said one or more reducing agents comprise or consist of sodium metabisulfite. In some embodiments, said composition may optionally comprise one or more flocculants, e.g., one or more polymer-based flocculants, e.g., one or more polyacrylamide-based flocculants. Any suitable flocculant or mixture of flocculants may be used in the methods described herein. In some embodiments, the one or more flocculants added to the fluid in need of treatment may comprise one or more polymer flocculants. In some embodiments, the polymer flocculants may be anionic or nonionic. Any high molecular weight anionic or nonionic polymer flocculants known in the art may be used in the methods described herein. Nonlimiting examples of polymer flocculants include, for example, flocculant-grade homopolymers, copolymers, and terpolymers prepared from monomers such as (meth)acrylic acid, (meth)acrylamide, N-t-butyl acrylamide sulfonic acid ("ATBS"), 2-acrylamido-2-methylpropane sulfonic acid, and ethylene oxide. In some embodiments, the polymer flocculant may be an anionic polymer. In some embodiments, the polymer flocculant may be a nonionic polymer. In some embodiments, the polymer flocculant may be a mixture of anionic polymers and nonionic polymers. In some embodiments, the one or more flocculants may comprise a polyacrylamide-based flocculant. In some embodiments, the dosage of the one or more flocculants may be any dosage that will achieve a necessary or desired result. In some embodiments, about the composition may comprise 5 ppm or less, 5 ppm or more, 10 ppm or more, 25 ppm or more, 50 ppm or more, 75 ppm or more, or 100 ppm or more of said one or more flocculants.

In some embodiments, the composition may comprise about 10 ppm or less, 10 ppm or more, 25 ppm or more, 50 ppm or more, 100 ppm or more, 200 ppm or more, 300 ppm or more, 400 ppm or more, 500 ppm or more, 600 ppm or more, 700 ppm or more, 800 ppm or more, 900 ppm or more, 1000 ppm or more, 1250 ppm or more, 1500 ppm or more, 1750 ppm or more, 2000 ppm or more, 2250 ppm or more, 2500 ppm or more, 2750 ppm or more, 3000 ppm or more, 4000 ppm or more, 5000 ppm or more, or 10,000 ppm or more of one or more coagulants, e.g., at least one iron-containing coagulants, e.g., ferrous chloride. In some embodiments, the composition may comprise about 10 ppm or less, 10 ppm or more, 25 ppm or more, 50 ppm or more, 100 ppm or more, 200 ppm or more, 300 ppm or more, 400 ppm or more, 500 ppm or more, 600 ppm or more, 700 ppm or more, 800 ppm or more, 900 ppm or more, 1000 ppm or more, 1250 ppm or more, 1500 ppm or more, 1750 ppm or more, 2000 ppm or more, 2250 ppm or more, 2500 ppm or more, 2750 ppm or more, 3000 ppm or more, 4000 ppm or more, 5000 ppm or more, or 10,000 ppm or more of the one or more reducing agents, e.g., at least one sodium sulfite-based reducing agent, e.g., sodium metabisulfite. In some embodiments, the ratio of the one or more reducing agents to one or more coagulants may be between about 0.36 to about 0.48 (ppm dry reducing agent:ppm dry coagulant). In some embodiments, the amounts of the one or more coagulants and one or more reducing agents of the composition may be based on the amount of selenium present in a fluid in need of treatment.

In some embodiments, said fluid in need of treatment, include, but are not limited to including, drinking water, ground water, well water, surface water, such as waters from lakes, ponds and wetlands, agricultural waters, wastewater, such as wastewater or leaching water from mining or industrial processes, industrial wastewater, geothermal fluids, water from mining processes associated with smelting, mine dewatering, tailing impoundment treatment, chemical induced leaching, flotation, autoclave, acid mine drainage, and the like. In some embodiments, the fluid in need of treatment may be produced from a mining process, for example a smelting process, such a smelting process gold, copper, iron, nickel, silver, phosphate, coal or molybdenum; or processes associated with mine dewatering, tailing impoundment treatment, chemical induced leaching, flotation, autoclave, acid mine drainage, and the like. In some embodiments, the fluid in need of treatment may comprise water and one or more oxyanions. In some embodiments, the fluid in need of treatment may comprise selenium, selenate, and/or selenite. In some embodiments, a fluid in need of treatment may comprise produced water. In some embodiments, a fluid in need of treatment may comprise water used in or derived from to gas production and/or gas exploration processes. In some embodiments, a fluid in need of treatment may comprise sea water or other brackish water. In some embodiments, a fluid in need of treatment may comprise boiler water, cooling water, seawater (e.g., in oil platform applications), brackish water, oilfield water, municipal treatment plant water, paper mill water (such as water used to process pulp, paper, and/or cardboard), mining water, water resulting from any part of a method associated with enhanced oil recovery, reverse osmosis process water, water used in geothermal applications or methods, water resulting from gas recovery, water resulting from oil recovery, and/or industrial treatment plant water. In some instances, a fluid in need of treatment may comprise a circulating fluid. In some embodiments, the circulating fluid may be utilized in, or may be a component of, a mining process, or may be in a system that is utilized in a mining process. In some embodiments, the circulating fluid may be utilized in, or may be a component of, a pulp, paper, and/or cardboard-related process, or may be in a system that is utilized in the processing of pulp, paper, and/or cardboard. In some embodiments, the circulating fluid may be utilized in, or may be a component of, an oil and gas exploration or production process, or may be in a system that is utilized in an oil and gas exploration and production process. In some embodiments, the circulating fluid may be utilized in, or may be a component of, coal processing, or may be in a system that is utilized in coal processing (e.g., coal slurry transport). In some embodiments, the circulating fluid may be utilized in, or may be a component of a reverse osmosis process. In some embodiments, the circulating fluid may be utilized in, or may be a component of a geothermal application or method.

EXAMPLES

Example 1—Treatment of Industrial Wastewater

In this example, a simulated industrial wastewater sample that comprised selenium was treated with ferrous chloride and sodium metabisulfite, and was compared to treatments of simulated industrial wastewater samples which comprised treatment with ferrous chloride alone, treatment with ferrous chloride and sodium thiosulfate, and treatment with ferrous chloride and sodium hydrosulfide.

The simulated industrial wastewater samples were treated as follows. 500 mL of industrial wastewater was added to a beaker, and the beaker was placed onto a stir plate. Each sample was slowly stirred using a magnetic stir bar. While stirring, compositions for the treatment of the samples, described above and in Table 1 below, were added to the samples, which generally resulted in the pH value of the solutions being between about 2 to about 4. The samples were stirred for 15-20 min. following addition of the compositions for treatment (referred to as the "conditioning stage"). Following the conditioning stage, the pH was raised to a value of about 9 to about 10 by addition of a caustic agent (such as NaOH) and stirring continued for approximately 3-5 min. before proceeding to the next step. After the 3-5 min. mixing period, a flocculant optionally can be added, and, if added, stirring at 100 rpm for approximately 5 minutes can follow the flocculant addition. Either after the mixing period following addition of the caustic agent, or after the mixing period following the optional flocculant addition, mixing was stopped and the sludge was allowed to settle for approximately 10 min. Next, the supernatant was filtered through a 0.45 μm membrane, and the resulting filtered sample was analyzed by inductively coupled plasma mass spectrometry (ICP-MS).

Referring now to Table 1, simulated industrial water samples were treated with either ferrous chloride alone, ferrous chloride and sodium metabisulfite, ferrous chloride and sodium thiosulfate, or not treated with any composition (untreated).

TABLE 1

| SAMPLE NUMBER | SAMPLE TREATMENT | CONDITIONING TIME BEFORE PH ADJUSTMENT | REACTION TIME AFTER PH ADJUSTMENT | SELENIUM (PPB) | % Se REMOVED |
|---|---|---|---|---|---|
| 1 | Untreated | N/A | N/A | 162 | N/A |
| 2 | 1500 ppm ferrous chloride (*) | 15 min. | 5 min. | 27 | 83.3 |
| 3 | 1500 ppm ferrous chloride (*) + 100 ppm sodium thiosulfate | 15 min. | 5 min. | 60 | 62.9 |
| 4 | 1500 ppm ferrous chloride (*) + 100 ppm sodium metabisulfite | 15 min. | 5 min. | 22 | 86.4 |

*Dosage of ferrous chloride based on liquid product (14% Fe by weight)

Referring now to Table 2, simulated industrial water samples were treated with either sodium hydrosulfide and ferrous chloride, sodium metabisulfite and ferrous chloride, or not treated with any composition (untreated).

TABLE 2

| SAMPLE NUMBER | SAMPLE TREATMENT | CONDITIONING TIME BEFORE PH ADJUSTMENT | REACTION TIME AFTER PH | SELENIUM (PPB) | % Se REMOVED |
|---|---|---|---|---|---|
| 5 | Untreated | N/A | N/A | 45 | N/A |
| 6 | 3000 ppm ferrous chloride (*) + 100 ppm sodium hydrosulfide | 15 min. | 15 min. | 29 | 35.6 |
| 7 | 3000 ppm ferrous chloride (*) + 100 ppm sodium metabisulfite | 15 min. | 15 min. | 13 | 71.1 |

*Dosage of ferrous chloride based on liquid product (14% Fe by weight)

As demonstrated by the results presented in both Table 1 and Table 2, samples treated with compositions comprising sodium metabisulfite performed significantly better at reducing the amount of selenium present in the samples, as compared to the untreated samples, samples treated with ferrous chloride alone, or samples treated with ferrous chloride and sodium thiosulfate or treated with ferrous chloride and sodium hydrosulfide. For example, the amount of selenium in Sample 4 was reduced from 162 ppb (untreated sample) to 22 ppb selenium following treatment, as compared to Sample 3, whose selenium content was only reduced from 162 ppb to 60 ppb selenium following treatment (see Table 1). Furthermore, the amount of selenium in Sample 7 was reduced from 45 ppb (untreated) to 13 ppb following treatment, as compared to Sample 6, whose selenium content was reduced from 45 ppb to 29 ppb.

Example 2—Treatment of Industrial Wastewater

In this example, simulated industrial water samples that comprised selenium were treated according to the procedure described above in Example 1, with the following modifications. For Sample 8, no sodium metabisulfite was added, only ferrous chloride (see Table 3). For Sample 9, sodium metabisulfite was added prior to addition of ferrous chloride, the sodium metabisulfite was applied during the conditioning stage, and ferrous chloride was added at the end of the conditioning stage followed immediately by addition of caustic to raise the pH value of the solution (see Table 3). For Sample 10, sodium metabisulfite and ferrous chloride were both added at the beginning of the conditioning stage (see Table 3). The conditioning time before pH adjustment was the same for all of Samples 8-10 (15 min.), and the reaction time following the conditioning step was the same for all of Samples 8-10 (30 min.).

TABLE 3

| SAMPLE # | FERROUS CHLORIDE (PPM) (*) | SODIUM META-BISULFITE (PPM) | CONDITIONING TIME BEFORE PH ADJUSTMENT (MIN) | REACTION TIME AFTER PH ADJUSTMENT (MIN) | % Se REMOVED |
|---|---|---|---|---|---|
| 8 | 280 | 0 | 15 | 30 | 71.1 |
| 9 | 280 | 200 | 15 | 30 | 84.9 |
| 10 | 280 | 200 | 15 | 30 | 96.3 |

*Dosage of ferrous chloride based on dry Fe

Referring now to Table 3, it was observed that addition of sodium metabisulfite and ferrous chloride significantly reduced the amount of selenium in the treated simulated industrial water samples, and that the combination of ferrous chloride and selenium in combination removed more selenium than treatment with ferrous chloride alone. Furthermore, it was observed that addition of ferrous chloride and sodium metabisulfite at the beginning of the conditioning stage resulted in the largest percentage of selenium removal (96.3%) of the present example. Moreover, the results of the present example demonstrated the synergistic effects obtained by adding ferrous chloride and sodium metabisulfite together.

Example 3—Treatment of Industrial Wastewater

In this example, simulated industrial water samples that comprised selenium were treated according to the procedure described above in Example 1, with the following modifications. For Sample 11, the conditioning time was 0 min. before the pH adjustment. For Sample 12, the conditioning time was 10 min. before the pH adjustment. For Sample 13, the conditioning time was 15 min. before pH adjustment. The reaction times after the pH adjustment for all of Samples 11-13 was 5 min. In all of Samples 11-13 sodium metabisulfite and ferrous chloride were both added at the beginning of the conditioning stage.

TABLE 4

| SAMPLE # | FERROUS CHLORIDE (PPM) | SODIUM META-BISULFITE (PPM) | CONDITIONING TIME BEFORE PH ADJUSTMENT (MIN) | REACTION TIME AFTER PH ADJUSTMENT (MIN) | % Se REMOVED |
|---|---|---|---|---|---|
| 11 | 210 | 100 | 0 | 5 | 56.8 |
| 12 | 210 | 100 | 10 | 5 | 57.6 |
| 13 | 210 | 100 | 15 | 5 | 87.8 |

*Dosage of ferrous chloride based on dry Fe

Referring now to Table 4, it was observed that a conditioning step before pH adjustment increased the amount of selenium removed in the treated samples, and that a 15 min. conditioning time before pH adjustment resulted in the largest amount of selenium removal (87.8% removal).

Example 4—Treatment of Industrial Wastewater

In this example, simulated industrial water samples that comprised selenium were treated according to the procedure described above in Example 1, with the following modifications. The ratio of ferrous chloride to sodium metabisulfite, and the overall amount of either ferrous chloride and/or sodium metabisulfite, was as detailed in Tables 5 and 6 below. Furthermore, for Sample 14, only ferrous chloride, and no sodium metabisulfite, was added. In Samples 15-23, sodium metabisulfite and ferrous chloride were both added at the beginning of the conditioning stage. In all of Samples 14-23, the conditioning time before pH adjustment was 15 min., and the reaction time after pH adjustment was 5 min.

TABLE 5

| SAMPLE # | FERROUS CHLORIDE (PPM) (*) | SODIUM META-BISULFITE (PPM) | RATIO (**) | CONDITIONING TIME BEFORE PH ADJUSTMENT (MIN) | REACTION TIME AFTER PH ADJUSTMENT (MIN) | % Se REMOVED |
|---|---|---|---|---|---|---|
| 14 | 210 | 0 | 0 | 15 | 5 | 70.5 |
| 15 | 210 | 50 | 0.24 | 15 | 5 | 71.2 |
| 16 | 210 | 75 | 0.36 | 15 | 5 | 64.0 |
| 17 | 210 | 100 | 0.48 | 15 | 5 | 87.8 |
| 18 | 210 | 150 | 0.71 | 15 | 5 | 69.1 |

* Dosage of ferrous chloride based on dry Fe
** Ratio = (ppm dry Sodium metabisulfite)/(ppm dry Fe)

TABLE 6

| SAMPLE # | FERROUS CHLORIDE (PPM) (*) | SODIUM META-BISULFITE (PPM) | RATIO (**) | CONDITIONING TIME BEFORE PH ADJUSTMENT (MIN) | REACTION TIME AFTER PH ADJUSTMENT (MIN) | % Se REMOVED |
|---|---|---|---|---|---|---|
| 19 | 168 | 60 | 0.36 | 15 | 5 | 68.5 |
| 20 | 168 | 70 | 0.42 | 15 | 5 | 43.4 |
| 21 | 168 | 80 | 0.48 | 15 | 5 | 47.6 |
| 22 | 168 | 90 | 0.54 | 15 | 5 | 49.7 |
| 23 | 168 | 100 | 0.60 | 15 | 5 | 47.6 |

* Dosage of ferrous chloride based on dry Fe
** Ratio = (ppm dry Sodium metabisulfite)/(ppm dry Fe)

Referring now to Tables 5 and 6, it was observed that the ratio of sodium metabisulfite to ferrous chloride effected the amount of selenium removed from the treated industrial water samples. The results presented in Tables 5 and 6 suggested that a ratio of sodium metabisulfite:ferrous chloride of between about 0.36 to about 0.48 resulted in the greatest amount of selenium removal. For example, treatment of Sample 17, which had a sodium metabisulfite:ferrous chloride ratio of 0.48, resulted in removal of 87.8% of the selenium, and treatment of Sample 19, which had a sodium metabisulfite:ferrous chloride ratio of 0.36, resulted in removal of 68.5% of the selenium.

Example 5—Treatment of Industrial Wastewater

In this example, simulated industrial water samples that comprised selenium were treated according to the procedure described above in Example 1, with the following modifications. For Sample 24, the reaction time after pH adjustment was 5 min. For Sample 25, the reaction time after pH adjustment was 10 min. For both Sample 24 and Sample 25, the conditioning time before pH adjustment was 15 min. For both Sample 24 and Sample 25, sodium metabisulfite and ferrous chloride were both added at the beginning of the conditioning stage.

TABLE 7

| SAMPLE # | FERROUS CHLORIDE (PPM) (*) | SODIUM META-BISULFITE (PPM) | RATIO (**) | CONDITIONING TIME BEFORE PH ADJUSTMENT (MIN) | REACTION TIME AFTER PH ADJUSTMENT (MIN) | % Se REMOVED |
|---|---|---|---|---|---|---|
| 24 | 168 | 80 | 0.48 | 15 | 5 | 51.0 |
| 25 | 168 | 80 | 0.48 | 15 | 10 | 39.9 |

\* Dosage of ferrous chloride based on dry Fe
\*\* Ratio = (ppm dry Sodium metabisulfite)/(ppm dry Fe)

Referring now to Table 7, it was observed that a shorter reaction time after pH adjustment (5 min. compared to 10 min.) resulted in a greater percentage of the selenium being removed (51.0% compared to 39.9%).

In the preceding procedures, various steps have been described. It will, however, be evident that various modifications and changes may be made thereto, and additional procedures may be implemented, without departing from the broader scope of the procedures as set forth in the claims that follow.

The invention claimed is:

1. A method for removing selenium from a fluid in need of treatment, wherein said method comprises adding one or more coagulants and one or more sulfite-based reducing agents to the fluid in an amount effective to reduce the amount of and/or remove at least a portion of the selenium from said fluid in need of treatment, thereby producing a fluid mixture comprising the one or more coagulant and the one or more sulfite-based reducing agents, wherein the fluid mixture comprises a ratio of the sulfite-based reducing agent to the coagulant, in unit of ppm dry sulfite-based reducing agent:ppm dry coagulant, of between about 0.36 to about 0.48.

2. The method of claim 1, wherein:
 i. said one or more coagulants comprise or consist of iron containing coagulants;
 ii. said one or more coagulants comprise or consist of ferrous chloride;
 iii. said one or more sulfite-based reducing agents comprise or consist of sodium metabisulfite;
 iv. said one or more coagulants comprise or consist of ferrous chloride and said one or more sulfite-based reducing agents comprise sodium metabisulfite; and/or
 v. a combination of any two or more of (i)-(iv).

3. The method of claim 1, wherein said method comprises:
 a. adding one or more coagulants comprising ferrous chloride, and one or more sulfite-based reducing agents comprising sodium metabisulfite, to said fluid to produce the fluid mixture;
 b. conditioning the fluid mixture comprising the one or more coagulants and one or more reducing agents;
 c. adjusting a pH of the fluid mixture to between about 9 to about 10;
 d. conditioning the fluid mixture following pH adjustment;
 e. optionally adding one or more flocculants to said fluid mixture;
 f. allowing sludge to settle; and
 g. separating the selenium from the fluid mixture.

4. The method of claim 3, wherein:
 i. step b. comprises conditioning said fluid mixture for 5-10 min, 5-15 min, 5-20 min, 5-25 min, 5-30 min, 5-35 min, 5-40 min, 5-45 min, 5-50 min, 5-55 min, or 5-60 min;
 ii. step d. is of a duration of time sufficient to achieve maximum selenium removal;
 iii. step d. comprises conditioning said fluid mixture for about 3-5 min, 5-10 min, 5-15 min, 5-20 min, 5-25 min, 5-30 min, 5-35 min, 5-40 min, 5-45 min, 5-50 min, 5-55 min, or 5-60 min;
 iv. a decrease in the duration of time of conditioning in step d., after adjusting the pH, results in a higher degree of selenium removal as compared to longer duration of time(s) that is a method comprising a 5 min. duration conditioning step removes more selenium than a method comprising a 10 min. duration conditioning step;
 v. an increase in the duration of time of conditioning in step b., prior to adjusting the pH, results in a higher degree of selenium removal as compared to longer duration of time(s) that is a method comprising a 30 min. duration conditioning step removes more selenium than a method comprising a 15 min. duration conditioning step;
 vi. step d. comprises conditioning said fluid mixture for about 3-5 min;
 vii. steps a.-e. comprise agitating said fluid mixture;
 viii. step e. comprises the addition of one or more polymer-based flocculants;
 ix. step c. comprises the addition of one or more caustic agents, optionally wherein the one or more caustic agents are selected from the group consisting of: lime, sodium sulfide, sodium hydroxide, potassium hydroxide, other caustic substances, and mixtures thereof;
 x. in step g. selenium is separated from the fluid mixture by (1) gravity settling, or (2) the use of centrifuges, hydrocyclones, decantation, filtration, thickeners, or other mechanical separation methods;
 xi. said one or more flocculants comprise one or more of the following: one or more polymer-based flocculants; one or more anionic polymer flocculants; one or more nonionic polymer flocculants; one or more high molecular weight anionic or nonionic polymer flocculants; one or more flocculant-grade homopolymers, copolymers, and terpolymers prepared from monomers such as (meth)acrylic acid, (meth)acrylamide, N-t-butyl acrylamide sulfonic acid (ATBS), and ethylene oxide; and mixtures thereof,
 xii. in step e. an amount of the one or more flocculants added is 5-100 ppm, 5-75 ppm, 5-50 ppm, 5-25 ppm, or 5-10 ppm;
 xiii. step b. increases the degree of selenium removal from said fluid as compared to a method that does not comprise step b.;
 xiv. step f. comprises allowing the sludge to settle for about 10 min. or more; and/or
 xv. a combination of any two or more of (i)-(xiv).

5. The method of claim 1, wherein:
i. said method results in removal of 20-96%, 40-96%, 60-96%, or 80-96% of selenium from said fluid;
ii. said method results in removal of an amount of selenium from said fluid such that said fluid meets a desired standard regarding the amount of selenium present in the fluid;
iii. said method results in a selenium concentration in the fluid of about 100 ppb or less, about 90 ppb or less, about 80 ppb or less, about 70 ppb or less, about 60 ppb or less, about 50 ppb or less, about 40 ppb or less, about 30 ppb or less, about 20 ppb or less, about 13 ppb or less, about 10 ppb or less, about 5 ppb or less, or about 1 ppb or less;
iv. an amount ranging from 10-10,0000 ppm, 10-5000 ppm, 10-4000 ppm, 10-3000 ppm, 10-2000 ppm, 10-1500 ppm, 10-1000 ppm, 10-800 ppm, 10-600 ppm, 10-400 ppm, 10-200 ppm, 10-100 ppm, 10-50 ppm, or 10-25 ppm of said one or more coagulants is added to said fluid;
v. an amount ranging from 10-10,0000 ppm, 10-5000 ppm, 10-4000 ppm, 10-3000 ppm, 10-2000 ppm, 10-1500 ppm, 10-1000 ppm, 10-800 ppm, 10-600 ppm, 10-400 ppm, 10-200 ppm, 10-100 ppm, 10-50 ppm, or 10-25 ppm of said one or more sulfite-based reducing agents is added to said fluid;
vi. said one or more coagulants and one or more sulfite-based reducing agents are added simultaneously to said fluid in need of treatment;
vii. the addition of the one or more sulfite-based reducing agents and one or more coagulants is sequential;
viii. said one or more sulfite-based reducing agents and/or one or more coagulants are added to the fluid in need of treatment in one or more doses as needed or in intervals, in a stepwise fashion, or in a continuous fashion;
ix. said fluid in need of treatment comprises drinking water; ground water; well water; surface water comprising waters from lakes, ponds and wetlands; agricultural waters; wastewater comprising wastewater or leaching water from mining or industrial processes; industrial wastewater; geothermal fluids; and water from mining processes associated with smelting, mine dewatering, tailing impoundment treatment, chemical induced leaching, flotation, autoclave, or acid mine drainage;
x. said fluid in need of treatment is produced from a mining process comprising a smelting process of gold, copper, iron, nickel, silver, phosphate, coal or molybdenum; or processes associated with mine dewatering, tailing impoundment treatment, chemical induced leaching, flotation, autoclave, or acid mine drainage;
xi. said fluid in need of treatment comprises water and one or more oxyanions;
xii. the fluid in need of treatment comprises selenate and/or selenite;
xiii. the fluid in need of treatment comprises produced water;
xiv. the fluid in need of treatment comprises water used in or derived from gas production and/or gas exploration processes;
xv. the fluid in need of treatment comprises sea water or other brackish water;
xvi. the fluid in need of treatment comprises boiler water, cooling water, seawater optionally in oil platform applications, brackish water, oilfield water, municipal treatment plant water, paper mill water comprising water used to process pulp, paper, and/or cardboard, mining water, water resulting from any part of a method associated with enhanced oil recovery, reverse osmosis process water, water used in geothermal applications or methods, water resulting from gas recovery, water resulting from oil recovery, and/or industrial treatment plant water;
xvii. the fluid in need of treatment comprises; (1) a circulating fluid utilized in, or a component of, a mining process, or in a system that is utilized in a mining process; (2) a circulating fluid utilized in, or is a component of, a pulp, paper, and/or cardboard-related process, or is in a system that is utilized in a pulp, paper, and/or cardboard-related process; (3) a circulating fluid utilized in, or a component of a reverse osmosis process; (4) a circulating fluid utilized in, or a component of a geothermal application or method; (5) a circulating fluid utilized in, or a component of, an oil and gas exploration or production process, or in a system that is utilized in an oil and gas exploration and production process; and/or (6) a circulating fluid utilized in, or a component of, coal processing, or in a system that is utilized in coal processing or coal slurry transport;
xvii. the method is conducted at a temperature of 30-150° C., 30-125° C., 30-100° C., 30-90° C., 30-80° C., 30-70° C., 30-60° C., 30-50° C., or 30-40° C.; and/or
xix. a combination of any two or more of (i)-(xviii).

6. The method of claim 2, wherein:
i. the use of ferrous chloride and sodium metabisulfite in said method results in a greater degree of selenium removal as compared to methods comprising the addition of ferrous chloride and sodium hydrosulfide or methods comprising the addition of ferrous chloride and sodium thiosulfite to a fluid in need of treatment; and
ii. the use of ferrous chloride and sodium metabisulfite for the removal of selenium from said fluid in need of treatment results in synergistic effects.

7. The method of claim 4, wherein
said one or more polymer-based flocculants comprise one or more polyacrylamide-based flocculants.

* * * * *